June 19, 1951
W. H. BAERWALD ET AL
2,557,250
SADDLE TANK
Filed March 14, 1946
2 Sheets-Sheet 1
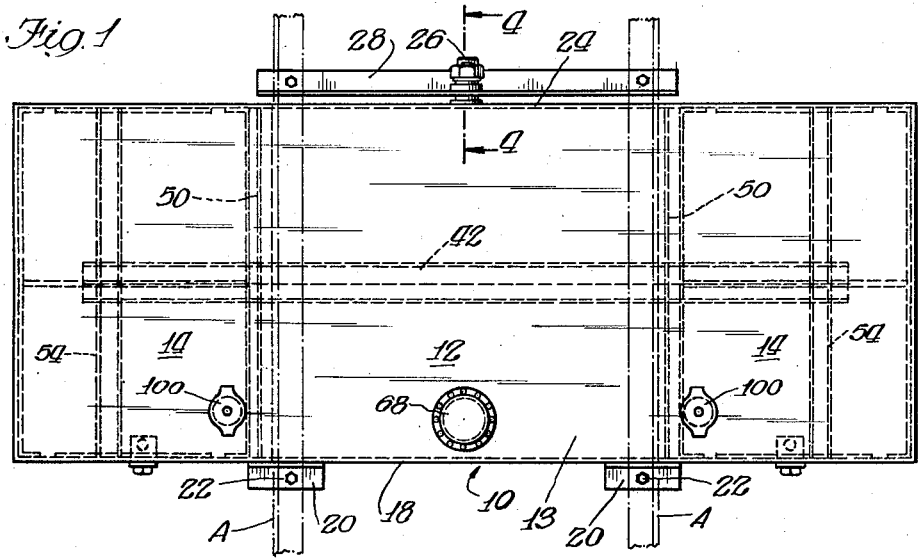
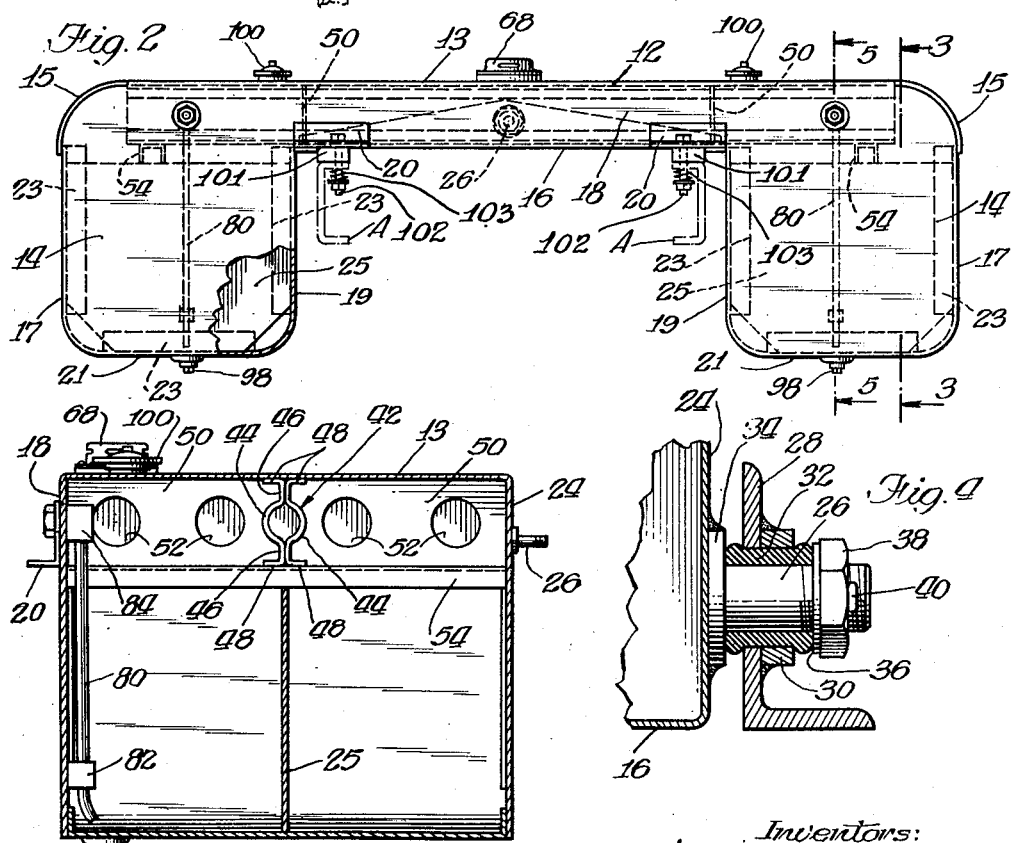
Inventors:
Walter H. Baerwald
Arthur A. Berg
By: Burton & Burton
Attorney.

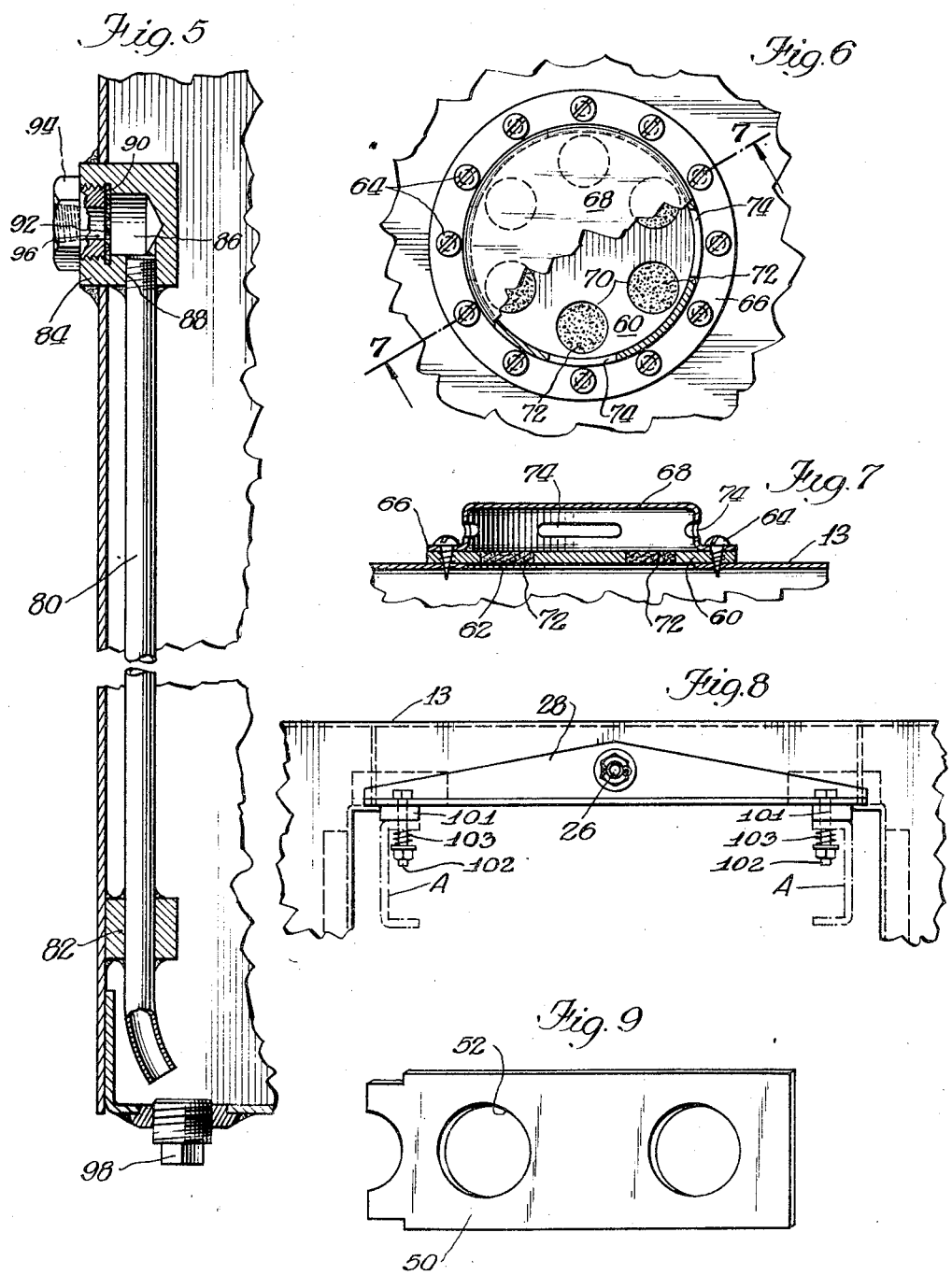

Patented June 19, 1951

2,557,250

UNITED STATES PATENT OFFICE 2,557,250

SADDLE TANK

Walter H. Baerwald and Arthur A. Berg, Chicago, Ill., assignors to Berg Mfg. & Sales Co., Chicago, Ill., a copartnership Application March 14, 1946, Serial No. 654,233

3 Claims. (Cl. 280—5)

This invention relates to the type of tank designed for carrying liquid fuel to be used in the internal combustion engine of a motor truck or tractor, or like vehicle, but it will be recognized that the utility of the structure is not confined to such use. The so-called "saddle tank" derives its name from the manner in which it is mounted on a motor vehicle. The tank comprises a relatively shallow middle section with deeper end sections depending therefrom, and the tank is supported on the longitudinal frame members of a truck or tractor, with the shallow middle section resting thereon and extending across the frame, while the deeper lateral sections depend at each side of the frame somewhat in the manner of saddle bags.

One object of the invention is to provide a new and improved construction for a saddle tank including a reinforcement in the form of a torque tube extending through the shallow middle section and into the deeper end sections of the tank and secured rigidly thereto.

Another object of the invention is to provide a new and improved mounting for securing the tank to the frame members of a vehicle or other support and adapted to permit some misalignment or weaving of the supporting structure without injury to the tank.

A further object of the invention is to provide an improved safety vent for a tank of the type indicated including one or more fusible plugs to relieve gas pressure in the tank if it should be subjected to fire or unduly high temperature.

Other objects and advantages of the invention will appear from the following description taken in connection with the drawings in which:

Fig. 1 is a top plan view of a saddle tank embodying this invention and illustrating the means by which it is secured to the side members of a vehicle frame.

Fig. 2 is an end elevation of the same.

Fig. 3 is a transverse vertical section taken as indicated at line 3—3 on Fig. 2.

Fig. 4 is a vertical detail section taken as indicated at line 4—4 on Fig. 1 and on a larger scale.

Fig. 5 is a fragmentary vertical section showing the feed pipe inside the tank, being taken as indicated at line 5—5 on Fig. 2 and on a larger scale.

Fig. 6 is a top plan detail view, partly in section, showing a safety vent structure for the tank.

Fig. 7 is a transverse section taken as indicated at line 7—7 on Fig. 6.

Fig. 8 is a fragmentary end elevation showing the opposite end of the tank from that seen in Fig. 2, and illustrating particularly a portion of the mounting structure.

Fig. 9 is a detail face view of one of the reinforcing plates employed in the tank.

The tank, which is indicated generally by the numeral 10 in the drawings, comprises a relatively shallow middle section 12 and deeper end sections 14, 14 or "buckets" depending for a considerable distance below the plane of the bottom wall of the middle section. The top wall 13 is common to the middle section 12 and both end sections 14. The bottom wall 16 of the middle section overlies the side members A, A of the vehicle frame when the tank is mounted on a truck or on the tractor of a separable tractor-trailer vehicle, and usually, when so mounted, the tank is disposed directly of the driver's cab. At this position there is likely to be an appreciable weaving of the frame in traversing uneven roads, and to prevent injury to the tank by reason of such movement of the frame it is provided with a three-point support. The front wall 18 of the middle section 12 has welded to it a pair of angle clips 20, 20 which rest respectively on the frame members A, A of the vehicle and may be secured thereto by bolts 22, 22.

From the middle of the rear wall 24 a threaded stud 26 projects horizontally through an aperture in a cross-bar 28 disposed with its opposite ends secured to the frame members A, A respectively. An opening at the middle of the bar 28 is reinforced by a collar 30 welded thereto, and a resilient bushing 32 of rubber or like material is fitted through the registered openings in the bar and collar and snugly embraces the stud 26. The stud includes a flat head 34 which is shown as welded to the wall 24 of the tank. The bushing 32 extends between the head 34 and a washer 36, and may be somewhat compressed longitudinally by the application of a securing nut 38 which may be locked in position by a cotter pin 40. With this arrangement any misalignment of the side frame members A, A is accommodated by the pivotal connection between the wall 24 of the tank and the cross-bar or beam 28 which supports it through the stud 26.

To reinforce and stiffen the tank so that it can be thus supported and suspended as a unit from any mounting a torque tube 42 extends through the shallow section 12 of the tank and more than half way through each of the depending deeper sections 14, 14, as indicated in dotted outline in Figs. 1 and 2. This tube is formed of two sections, each having a semi-cylindrical portion 44 with webs 46, 46 extending oppositely therefrom and with foot flanges 48, 48 bent at right angles to the webs 46, 46 respectively. The two sections are secured together, preferably by welding the faces of their webs 46 in contact so that the portions 44 form a complete cylinder, and the foot flanges 48 of one section are coplanar with the foot flanges of the other section. As shown in Fig. 3, the torque tube 42 fits snugly between the top and bottom walls of the shallow middle section 12 of the tank so that these walls may be welded to the foot flanges 48 of the torque tube, if desired.

Adjacent each end of the middle section 12 at which it adjoins one of the deep sections 14 of the tank there is secured a pair of reinforcing plates 50, 50 which extend in vertical planes with their upper and lower edges in contact with the top and bottom walls of the tank section 12. Their outer ends engage the front wall 18 and the rear wall 24, and their inner ends are cut to fit into engagement with the sides of the torque tube 44, the shape of each plate being clearly shown in Fig. 9. Each plate has a pair of relatively large apertures 52 providing access between the middle tank section 12 and the other sections 14, 14, so that when the plates 50, 50 are welded to the torque tube 42 and to the tank walls they do not completely shut off the middle section from either of the lateral tank sections 14, but do substantially reinforce the tank itself and assist in anchoring the torque tube therein.

Near each end of the torque tube its lower foot flanges 48 are welded to a channel member 54 which extends from the front wall to the rear wall of one of the deep tank sections 14. The torque tube is thus additionally secured and braced to the tank structure and, extending as far as it does into each of the tank sections 14, it contributes measurably to the support of the weight of liquid carried by these tank sections, in addition to lending torsional rigidity to the total tank structure which resists any tendency for the lateral sections 14 to be torn away from the middle section 12 under sudden stress or shock.

As a safety feature the top wall 13 of the middle section 12 carries a vent structure which includes a heavy gauge disk 60 fitting over an aperture 62 in said top wall of the tank. The disk is secured by screws 64 self-threaded into the wall 13 of the tank, and the heads of the screws overlie the flange 66 of a protective cap 68. The disk 60 is formed with a plurality of vent openings 70 into which plugs 72 of readily fusible alloy are tightly fitted, normally closing the opening 62 in the wall 13. In the event of fire, or if the tank is otherwise subjected to excessive temperature, one or more of the plugs 72 will fuse or soften sufficiently to become loosened so as to relieve the gas pressure produced in the tank by the rise of temperature. The cap 68 is formed with lateral slots 74 through which the gas pressure can then escape readily.

It will be understood that under present practice the fuel carried in the tank is withdrawn therefrom by suction, and for the purpose each of the deeper sections 14, 14 is provided with an outlet tube 80 secured in blocks 82 and 84. The block 82 is firmly secured to the inner surface of the tank wall, as by welding, and the block 84 is fitted into an opening in the wall and secured therein, preferably by welding, so that it becomes an integral part of the wall. The block 84 has an outwardly opening recess 86 intersected by a tapped hole 88 for the upper end of the feed pipe 80. The recess 86 is shouldered at 90 and a filter screen 92 is secured against the shoulder by a plug 94 screwed into the outer end of the recess. As shown, the plug 94 has an outlet bore 96 which is threaded to receive a fitting such as a compression coupling for connecting the usual feed tubing which leads to the fuel pump or other fuel feeding device for the motor to be supplied from the tank.

As shown, each of the deeper tank sections or "buckets" 14 has front and rear walls which are integral parts of the front and rear walls 18 and 24, already mentioned. The top wall 13 for the middle section 12 extends integrally over both bucket sections 14, being curved downwardly at its ends, as seen at 15, 15 to lap the side walls of the buckets. A single sheet forms both side walls 17 and 19 of each bucket section, as well as the bottom wall 21 thereof, and this sheet is connected to the front and rear walls by flanges 23, shown in dotted outline in Fig. 2. Each section is reinforced by a baffle plate 25 fitted across it about midway between its front and rear walls.

A drain plug 98 is provided in the bottom wall 21 of each bucket section of the tank, and preferably two filler caps, denoted by the numeral 100, are fitted in the top wall 13, each over one of the bucket sections. To secure the advantage of the three-point support provided by the two clips 20 and the stud 26, the clips 20 and the ends of the cross bar 28 will have blocks 101 interposed between them and the frame members A, A, as seen in Figures 2 and 8; if desired, these blocks may be of more or less resilient material, such as belting fabric, leather, rubber or a synthetic rubber, and the bolts 102 which secure the tank to the frame members A, A may have springs 103 interposed between the undersides of said frame members and the nuts on the bolts, as shown. This insures ample accommodation to any twist or weaving of the frame without danger of straining the tank.

While there is shown and described herein certain structure illustrating and embodying the invention, it will be understood that various changes and modifications will occur to those skilled in the art and may be made without departing from the spirit of the invention, and it is the intention to cover within the scope of the appended claims all such alterations and all equivalents which may be substituted for the features which are herein disclosed.

We claim:

1. In a saddle tank comprising a relatively shallow middle section and a pair of deeper end sections, said middle section having front and rear vertical walls and top and bottom horizontal walls, and means for securing said tank to a supporting structure which comprises a pair of spaced members, with said deeper end sections depending below said spaced members, said means including a threaded stud projecting from one of said vertical walls, a cross bar dimensioned to span said members and to rest upon them with said stud extending pivotally through said cross bar substantially midway between said spaced members, a resilient bushing embracing said stud and interposed between the stud and the bearing surface of the cross bar, and angle clips secured to the opposite vertical wall of the middle section and positioned to rest, respectively, upon said members.

2. In a saddle tank comprising a relatively shallow middle section and a pair of deeper end sections, said middle section having front and rear vertical walls and top and bottom horizontal walls, and means for securing said tank to a supporting structure which comprises a pair of spaced members, said means including a threaded stud projecting from one of said vertical walls, a cross bar dimensioned to span said members and to rest upon them with said stud extending pivotally through said cross bar, a resilient bushing interposed between the stud and the bearing surface of the cross bar and confined longitudinally between the head of the stud and a nut screw-threaded on the free end of the stud whereby the bushing may be maintained under compression, and angle slips secured to the opposite vertical wall of the middle section and positioned to rest, respectively, upon said members.

3. In a saddle tank comprising a relatively shallow middle section and a pair of deeper end sections, said middle section having front and rear vertical walls, and means for securing said tank to a supporting structure which comprises a pair of spaced members, said means including a pair of lugs secured by bolts to one of said vertical walls in spaced relation to each other and in position to rest respectively upon said spaced members, springs interposed between the nuts of the respective bolts and the under sides of the respective spaced members, a third lug secured to the opposite vertical wall at the middle of its width, and a crossbar dimensioned to span said members and being secured to said members by bolts, springs being interposed between the nuts of the respective bolts and the under sides of the respective frame members, with said third lug pivotally engaging the crossbar, with the deeper end sections of the tank depending below the points of support between said pair of lugs and said third lug with the spaced members and with the crossbar respectively.

WALTER H. BAERWALD.
ARTHUR A. BERG.

REFERENCES CITED

The following references are of record in the file of this patent:

UNITED STATES PATENTS

| Number | Name | Date |
| --- | --- | --- |
| 937,713 | Page | Oct. 19, 1909 |
| 1,365,110 | Kramer | Jan. 11, 1921 |
| 1,611,906 | Gurney | Dec. 28, 1926 |
| 1,727,609 | Kramer | Sept. 10, 1929 |
| 2,003,808 | Mascuch | June 4, 1935 |
| 2,037,024 | Holby | Apr. 14, 1936 |
| 2,178,401 | Meyerhoefer | Oct. 31, 1939 |
| 2,181,772 | Snyder | Nov. 28, 1939 |
| 2,208,621 | Ball et al. | July 23, 1940 |
| 2,314,298 | Welch | Mar. 16, 1943 |
| 2,465,173 | Scales | Mar. 22, 1949 |